US011095455B2

(12) United States Patent
Engan et al.

(10) Patent No.: US 11,095,455 B2
(45) Date of Patent: Aug. 17, 2021

(54) RECURSIVE TOKEN BINDING FOR CASCADED SERVICE CALLS

(71) Applicant: T-Mobile USA, Inc., Bellevue, WA (US)

(72) Inventors: Michael Engan, Bellevue, WA (US); Douglas McDorman, Sammamish, WA (US); James Latham, Redmond, WA (US); Vikash Kodati, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 286 days.

(21) Appl. No.: 16/366,340

(22) Filed: Mar. 27, 2019

(65) Prior Publication Data

US 2019/0312733 A1    Oct. 10, 2019

Related U.S. Application Data

(60) Provisional application No. 62/653,539, filed on Apr. 5, 2018.

(51) Int. Cl.
*H04L 29/06*    (2006.01)
*H04L 9/32*    (2006.01)
(Continued)

(52) U.S. Cl.
CPC .......... *H04L 9/3247* (2013.01); *H04L 9/0643* (2013.01); *H04L 9/0825* (2013.01);
(Continued)

(58) Field of Classification Search
CPC ... H04L 9/3247; H04L 9/0643; H04L 9/0825; H04L 9/3073; H04L 9/3213; H04L 63/168
See application file for complete search history.

(56) References Cited

U.S. PATENT DOCUMENTS 6,668,322 B1    12/2003    Wood et al.
6,842,863 B1    1/2005    Fox et al.
(Continued)

OTHER PUBLICATIONS

International Application No. PCT/US2018/047373, International Search Report and Written Opinion dated Dec. 11, 2018, 12 pages.
(Continued)

*Primary Examiner* — Sher A Khan
(74) *Attorney, Agent, or Firm* — Han Santos, PLLC

(57) ABSTRACT

The present disclosure describes techniques that improve upon the use of authentication tokens as a means of verifying a user identity. Rather than facilitating the issuance of authentication tokens as bearer tokens, whereby any user may present an authentication token to a secure service provider for access to secure service, this disclosure describes techniques for generating recursive authentication tokens that are digitally signed by an Identity Service Provider (IDP) and the entity that purports to present the authentication token to the service provider. Additionally, a recursive token application is described that is configured to nest preceding authentication tokens that trace back to an initial secure service request. For example, a recursive authentication token received by a second service provider may include, nested therein, the first service provider recursive authentication token and a preceding client recursive authentication token that is associated with the initial secure service request.

20 Claims, 7 Drawing Sheets

(51) Int. Cl.
  *H04L 9/08* (2006.01)
  *H04L 9/06* (2006.01)
  *H04L 9/30* (2006.01)

(52) U.S. Cl.
  CPC .......... *H04L 9/3073* (2013.01); *H04L 9/3213* (2013.01); *H04L 63/168* (2013.01)

(56) References Cited

U.S. PATENT DOCUMENTS

| | | | |
|---|---|---|---|
| 7,711,122 B2* | 5/2010 | Allen | H04L 9/0825 380/286 |
| 7,849,326 B2 | 12/2010 | Chao | |
| 8,601,553 B1 | 12/2013 | Griffin et al. | |
| 8,880,889 B1 | 11/2014 | Ward et al. | |
| 9,240,886 B1* | 1/2016 | Allen | H04L 9/3213 |
| 9,264,902 B1 | 2/2016 | Ward et al. | |
| 9,331,990 B2 | 5/2016 | Saint | |
| 9,462,473 B2 | 10/2016 | Ward et al. | |
| 9,641,344 B1 | 5/2017 | Kim | |
| 9,947,008 B1 | 4/2018 | Diaz | |
| 2006/0021004 A1* | 1/2006 | Moran | H04L 63/08 726/2 |
| 2006/0168446 A1 | 7/2006 | Ahonen et al. | |
| 2008/0189778 A1* | 8/2008 | Rowley | H04L 63/0823 726/9 |
| 2009/0328207 A1 | 12/2009 | Patel | |
| 2010/0329464 A1 | 12/2010 | Kerschbaum | |
| 2013/0031361 A1 | 1/2013 | Fahn et al. | |
| 2013/0219473 A1 | 8/2013 | Schaefer | |
| 2013/0347071 A1* | 12/2013 | Polo Moragon | H04L 63/0853 726/3 |
| 2014/0250003 A1 | 9/2014 | Levchin et al. | |
| 2014/0325640 A1 | 10/2014 | Aggarwal et al. | |
| 2015/0113283 A1 | 4/2015 | Corella et al. | |
| 2015/0150109 A1 | 5/2015 | Bocanegra et al. | |
| 2015/0281362 A1 | 10/2015 | Shanmugam et al. | |
| 2015/0341330 A1 | 11/2015 | Field-Eliot et al. | |
| 2016/0094531 A1* | 3/2016 | Unnikrishnan | G06F 21/31 726/7 |
| 2016/0142409 A1 | 5/2016 | Frei et al. | |
| 2016/0241405 A1* | 8/2016 | Jeong | H04L 63/0428 |
| 2016/0300223 A1 | 10/2016 | Grey et al. | |
| 2016/0344635 A1* | 11/2016 | Lee | H04L 47/20 |
| 2017/0171187 A1 | 6/2017 | Yin et al. | |
| 2017/0289197 A1 | 10/2017 | Mandyam et al. | |
| 2018/0219863 A1 | 8/2018 | Tran | |
| 2019/0044940 A1* | 2/2019 | Khalil | H04L 9/3247 |
| 2019/0165942 A1 | 5/2019 | Subramaniam et al. | |
| 2019/0312730 A1 | 10/2019 | Engan et al. | |

OTHER PUBLICATIONS

U.S. Appl. No. 151788,731, Final Office Action dated Jun. 7, 2019, 19 pages.
U.S. Appl. No. 15/828,266, Notice of Allowance dated Sep. 24, 2019, 14 pages.
U.S. Appl. No. 15/683,666, Final Office Action dated Jun. 21, 2019, 17 pages.
U.S. Appl. No. 15/683,666, Non Final Office Action dated Feb. 8, 2019, 21 pages.
U.S. Appl. No. 15/683,666, Notice of Allowance dated Jan. 14, 2020, 27 pages.
U.S. Appl. No. 15/788,731 Notice of Allowance dated Aug. 26, 2019, 7 pages.
U.S. Appl. No. 15/828,266, Restriction Requirement dated Jun. 25, 2019, 5 pages.
3GPP; Technical Specification Group Services and System Aspects; 3rd Generation Partnership Project; Security Aspects; Study on Service Based Architecture (SBA) Security (Release 15), 3GPP TR 33.855 V0.1.0, May 2018. See Section 6.2.2.2.1 and Section 6.2.2.2.2.
The International Search Report and Written Opinion for PCT Application No. PCT/US2018/056157, dated Feb. 7, 2019, 11 pages.
The Non-Final Office Action for U.S. Appl. No. 15/788,731, dated Feb. 7, 2019, 34 pages.
M. Jones et al., 'Proof-of-Possession Key Semantics for JSON Web Tokens (JWTs)', IETF RFC 7800, Apr. 1, 2016 See pp. 4-9 and figures 1, 2.

* cited by examiner

RECURSIVE TOKEN BINDING FOR CASCADED SERVICE CALLS

CROSS-REFERENCE TO RELATED PATENT APPLICATION

This application claims priority to a co-pending, commonly owned U.S. Provisional Patent Application No. 62/653,539 filed on Apr. 5, 2018 and titled "Cross Carrier ID (CCID) Token Binding," which is herein incorporated by reference in its entirety.

BACKGROUND

Present day, a vast majority of internet-based applications are accessible using authentication tokens as a means of authenticating an identity of a user associated with an access request. The use of authentication tokens allows a user to access multiple secure servers that host web applications after a single login, rather than the user having to individually log into each secure server. This form of token-based authentication is performed in lieu of manually inputting client sign-on credentials, e.g., username and password, for verification by a service provider. Following validation of the authentication token, the service provider may grant the application or application access to the secure service.

The authentication tokens described above are known as bearer tokens, which means that any actor may use the authentication token to obtain a secure service. Typically, secure service providers do not take any additional authentication steps to verify that the authentication token is being presented by a user to whom the authentication was originally issued. As a result, authentications tokens are susceptible to being stolen and used by malicious actors to gain unauthorized access to a secure server.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
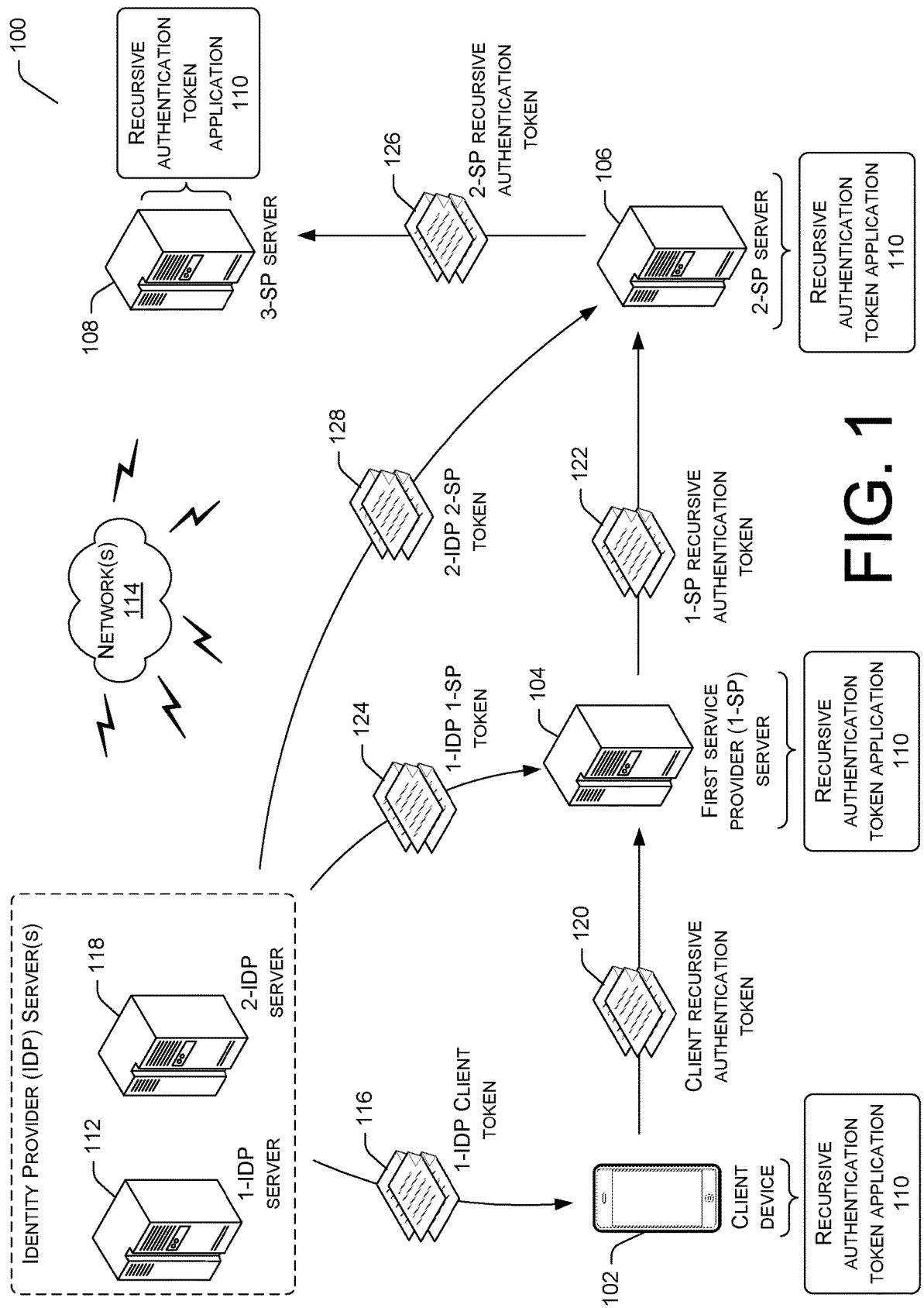
FIG. 1 illustrates an example network architecture for generating a recursive authentication token for issuance between a client device and one or more service providers.

The present disclosure describes techniques that improve upon the use of authentication tokens as a means of verifying an identity of a user requesting access to a secure service. Rather than facilitating the issuance of authentication tokens as bearer tokens, whereby any user may present an authentication token to a secure service provider for access to secure service, this disclosure describes techniques for generating recursive authentication tokens that are digitally signed by an Identity Service Provider (IDP) and the entity that purports to present the authentication token to the service provider for access to a secure service.

For example, an entity requesting access to a secure service provided by a service provider may generate a recursive authentication token that nests an IDP authentication token issued by an IDP server therein. The recipient (i.e. service provider of a secure service) of the recursive authentication token may first authenticate the IDP authentication token as having been issued by the IDP server, and in doing so, rely on the payload of the IDP authentication token to verify an identity of the entity that generated the recursive authentication token. As a result, the service provider may verify that the IDP authentication token was obtained from a trusted IDP server and that the recursive authentication token had not been altered since being created by the entity requesting access to the secure service.

In a non-limiting example, consider a client device initiating a request to access a secure service provided by a first service provider (1-SP). The secure service may relate to establishing a secure communicative connection between the client device and a recipient device. To provision the secure communication connection, the 1-SP may need to interact with a second service provider (2-SP) to obtain policy information relating to the client device and/or recipient device. While this disclosure describes techniques that allow the 1-SP to verify an authenticity of a recursive authentication token received from the client device, this disclosure also describes techniques that allow the 2-SP to verify an authenticity of a recursive authentication token received from the 1-SP as part of a related request for policy information.

In other words, the recursive authentication token may be configured to nest preceding authentication tokens that trace back to the initial secure service request. Continuing with the above-referenced example, a recursive authentication token received by the 2-SP may include, nested therein, the 1-SP recursive authentication token requesting access to policy information and the preceding client recursive authentication token requesting a secure communication connection with a recipient device.

Furthermore, this disclosure improves upon the use of present-day authentication tokens (i.e. bearer tokens) by incorporating digital signatures from trusted IDP servers and entities (i.e. client devices and service providers) issuing the authentication tokens. For example, prior to initiating a request to access a secure service from a service provider, a client device, via a recursive token application, may establish a trust relationship with an IDP server. As part of a registration process, the client device may provide the IDP server with a client public key of an asymmetric public-private key pair generated by the client device, and in response, the IDP server may issue an IDP client token that is digitally signed by an IDP private key of an IDP public-private key pair generated by the IDP server. The IDP server may nest the client public key within the payload of the IDP client token. The IDP server may digitally sign the IDP client token as a means of validating the content and origin of the IDP client token.

At a later point in time, the client device may initiate a request to access a secure service provided by a service provider. The client device, via a recursive token application, may generate a recursive authentication token that nests the IDP token issued by the IDP server along with a payload message that requests access to the secure service from the service provider. In this example, the client recursive authentication token may be digitally signed by a client private key of the client public-private key pair generated by the client device. The client device may digitally sign the client recursive authentication token as a means of validating the content and origin of the recursive authentication token. It is noteworthy that the client private key used to digitally sign the client recursive authentication token is the counterpart to the client public key nested within the payload of IDP client token, which in turn, is nested within the client recursive authentication token.

In order for an SP to provide a client device with access to a secure service, the SP may validate 1) the content and origin of the IDP client token nested within the client recursive authentication token, and 2) the content and origin of the client recursive authentication token, itself.

First, the SP may establish a trust relationship with the IDP server that issued the ID client token through a registration process. As part of the registration process, the IDP server may provide the SP with an IDP public key that is a counterpart to the IDP private key used to sign the IDP client token. In this regard, the SP may use the IDP public key to verify the IDP digital signature of the IDP client token. By validating the IDP client token, the SP can confirm the content and origin of the IDP client token.

Second, the SP may extract a client public key that is nested within the IDP client token and further use the client public key to verify the client digital signature of the client recursive authentication token. In doing so, the SP may validate the content and origin of the client recursive authentication token.

Further, the term "techniques," as used herein, may refer to system(s), method(s), computer-readable instruction(s), module(s), algorithms, hardware logic, and/or operation(s) as permitted by the context described above and through the document.

FIG. 1 illustrates an example architecture for generating a recursive authentication token for issuance between a client device and one or more service providers. The service providers may be any type of service provider that provides secure services to a client device and/or another service provider. For example, the service provider may be a wireless carrier network that provides client subscription services (i.e. secure voice and/or secure data connectivity) to a client device. In another example, the service provider may be a navigation service provider that provides a current geolocation of a client device, or a blogging service that provides the latest blog entries to an application on the client device.

The example architecture 100 may include a recursive token application that is configured to operate on a client device 102 and one or more service provider server(s). While the illustrated example of FIG. 1 includes a first service provider (1-SP) server 104, a second service provider (2-SP) server 106, and third service provider (3-SP) server 108, in other implementations, any number of service provider server(s) is possible.

In various examples, the client device 102 may be a mobile handset, a smartphone, a tablet computer, a personal digital assistant (PDA), a smartwatch, or any other electronic communication or Internet of Things (IoT) device that is capable of executing applications, including the recursive authentication token application 110.

In the illustrated example, the client device 102 may establish a trust relationship with an Identity Service Provider (IDP), such as a first IDP (1-IDP) server 112, via one or more network(s) 114. The trust relationship may be established via a registration process, whereby the 1-IDP server 112 may generate and issue an IDP client token 116 to the client device 102. While the illustrated example of FIG. 1 includes a 1-IDP server 112 and a 2-IDP server 118, in other implementations, any number of IDP servers is possible.

Moreover, the client device 102 may initiate a request for access to a secure service provided by the 1-SP server 104. The secure service may relate to establishing a secure communicative connection (i.e. voice or data) with a recipient device. Alternatively, the secure service may relate to accessing proprietary data or privileged data from a data store accessible via the 1-SP server 104. In any case, the client device 102 may generate and transmit, via a recursive authentication token application 110, a client recursive authentication token 120 to the 1-SP server 104. The client recursive authentication token 120 may include, nested therein, a payload message requesting access to the secure service provided by the 1-SP server 104 and the IDP client token 116 issued by the 1-IDP server 112. It is noteworthy that the process for generating and validating a client recursive authentication token 120 is described in more detail with reference to FIG. 2 of this disclosure.

Upon receipt of the client authentication token, the 1-SP server 104 may establish a trust relationship with the 1-IDP server 112 that issued the IDP client token 116 nested within the client recursive authentication token 120. In doing so, the 1-SP server 104 may validate an authenticity of the client recursive authentication token 120. In one example, the 1-SP server 104 may parse through the payload message included therein to determine that additional secure services are required from another service provider, such as the 2-SP server 106. The additional secure services may relate to policy information associated with the client device 102 and/or the original access request.

In doing so, the 1-SP server 104 may generate and transmit, via a recursive authentication token application 110, a 1-SP recursive authentication token 122 to the 2-SP server 106. The 1-SP recursive authentication token 122 may include, nested within its payload, a payload message requesting access to the secure service provided by the 2-SP server 106, a 1-IDP 1-SP token 124 issued by a trusted IDP server, such as 1-IDP server 112, and the preceding client recursive authentication token 120 received from the client device 102. It is noteworthy that the process for generating and validating the 1-SP recursive authentication token 122 is described in more detail with reference to FIG. 3 of this disclosure.

Upon receipt of the 1-SP authentication token, the 2-SP server 106 may establish a trust relationship with the 1-IDP server 112 that issued the 1-IDP 1-SP token 124 nested within the 1-SP recursive authentication token 122. In doing so, the 2-SP server 106 may validate an authenticity of the 1-SP recursive authentication token 122. In one example, the 2-SP server 106 may determine that additional secure services are required from another service provider, such as the 3-SP server 108.

In doing so, the 2-SP server 106 may generate and transmit, via a recursive authentication token application 110, a 2-SP recursive authentication token 126 to the 3-SP server 108. The 2-SP recursive authentication token 126 may include, nested within its payload, a payload message requesting access to the secure service provided by the 3-SP server 108, a 2-IDP 2-SP token 128 issued by a trusted IDP server, such as 2-IDP server 118, and the preceding 1-SP recursive authentication token 122 received from the 1-SP server 104. It is noteworthy that the 2-SP server 106 may establish a trust relationship with a different IDP server, namely the 2-IDP server 118, to generate the 2-IDP 2-SP token 128 when compared with the trust relationship required to validate the 1-SP recursive authentication token 122 received from the 1-SP server 104. It is further noteworthy that the process for generating and validating the 2-SP recursive authentication token 126 is described in more detail with reference to FIG. 4 of this disclosure.

In various examples, the one or more service provider(s), namely the 1-SP server 104, the 2-SP server 106, and the 3-SP server 108 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices via one or more network(s) 114.

The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Figure 2:
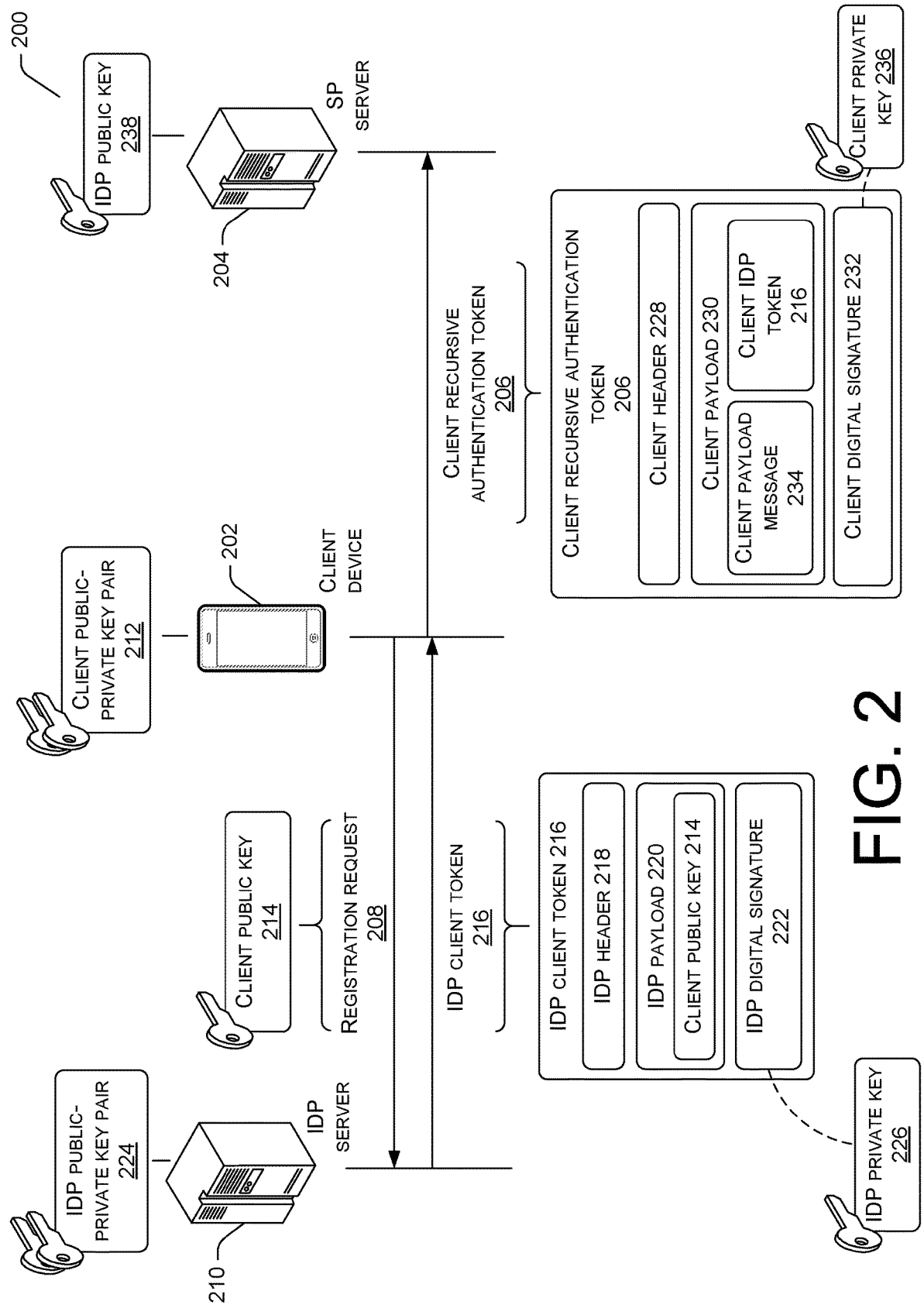
FIG. 2 illustrates a block diagram of a process for generating a client recursive authentication token for use by a client device in accessing a secure service provided by a service provider (SP) server.

FIG. 2 illustrates a block diagram of a process 200 for generating a client recursive authentication token for use by a client device in accessing a secure service provided by a service provider (SP) server. In the illustrated example, process 200 is initiated by a client device 202 requesting access to a secure service provided by an SP server 204. In a non-limiting example, the secure service may relate to access of proprietary data held in trust by the SP server 204. In the illustrated example, the SP server 204 may use the client recursive authentication token 206 to verify an identity of the sender, namely the client device 202.

Referring to FIG. 2 and from the perspective of the client device 202, the client device 202 may transmit a registration request 208 to an IDP server 210 for the purpose of establishing a trust relationship. As part of the registration process, the client device 202 may generate a client public-private key pair 212 (i.e. an asymmetric public-private key pair) and transmit the client public key 214 to the IDP server 210. In some examples, the registration request 208 may be performed via a Hyper Text Transfer Protocol (HTTP) POST operation, whereby the client public key 214 is encoded in the payload of the registration request. In at least one example, the client device 202 may also include additional information related to the client device 202, such as a transaction identifier, identification of an algorithm used to digitally sign an authentication token or a client identifier. Upon receipt, the IDP server 210 may optionally store the client public key 214 in a data store.

Following the registration process, the IDP server 210 may generate an IDP client token 216 that includes an IDP header 218, an IDP payload 220, and an IDP digital signature 222. In at least one example, the IDP client token 216 may be a JavaScript Object Notation (JSON) Web Token (JWT). However, the IDP client token 216 may have other data structure formats that serve a similar purpose.

The IDP header 218 may include information relating to the type of token, a digital signature algorithm used for the IDP client token 216 (i.e. HMAC with SHA256, ECDSA, RSASSA-PSS, etc.), and the components (i.e. header and/or payload) that are hashed to generate the IDP digital signature 222.

The IDP payload 220 may include the client public key 214 that the client device 202 shared with the IDP server 210 during the registration process. In some examples, the IDP payload 220 may also include the additional information provided during registration, such as a transaction identifier or a client identifier. Typically, the IDP payload 220 may also include information that identifies the issuer of the IDP client token 216 (i.e. the IDP server 210), a subject of the token, an expiration time of the token, and/or so forth. The IDP header 218 and the IDP payload 220 may be encoded using Base64, Base64url, or some other binary-to-text encoding scheme.

The IDP server 210 may generate the IDP digital signature 222 using a private key of an asymmetric public-private key pair. For example, the IDP server 210 may generate an IDP public-private key pair 224 using a key generation algorithm, such as the Rivest-Shamir-Adleman (RSA) algorithm, the Elliptic-Curve cryptography (ECC) algorithm, the Paillier cryptosystem algorithm, or the Cramer-Shoup cryptosystem algorithm, or any other suitable key generation algorithm. Further, the IDP server 210 may generate the IDP digital signature 222 by signing the IDP header 218 and the IDP payload 220 with the IDP private key 226 of an IDP public-private key pair 224. Accordingly, the IDP digital signature 222 may be used to verify an identity of the IDP server 210 as the original sender of the IDP client token 216 and to further ensure that IDP client token 216 had not been modified since being sent by the IDP server 210.

Upon receipt of the IDP client token 216 from the IDP server 210, the client device 202 may generate, via a recursive authentication token application, a client recursive authentication token 206 that is intended for delivery to the SP server 204. The client recursive authentication token 206 may comprise a client header 228, a client payload 230, and a client digital signature 232. The client header 228 may include information regarding the type of token and the digital signature algorithm used for the client recursive authentication token 206 (i.e. HMAC with SHA256, ECDSA, RSASSA-PSS, etc.), and an identification of the components that are hashed to generate the client digital signature 232. The client payload 230 may include the IDP client token 216 received from the IDP server 210 and a client payload message 234 associated with a request for access to the secure service provided by the SP server 204. The client digital signature 232 may be generated by signing the client header 228 and/or the client payload 230 with a client private key 236 of a client public-private key pair 212 generated by the client device 202 and using the digital signature algorithm identified in the client header 228.

Accordingly, the client digital signature 232 may be used to verify the identity of the client device 202 as the sender of the client recursive authentication token 206 since the IDP client token 216, nested therein, includes the counterpart client public key 214 of the client public-private key pair 212. In one example, the client device 202 may embed the client recursive authentication token 206 in an authorization header of a Hypertext Transfer Protocol (HTTP) request to deliver the client recursive authentication token 206 to the SP server 204. However, alternative methods of delivering the client recursive authentication token 206 may be used.

From the perspective of the SP server 204, prior to validating the client recursive authentication token 206, the SP server 204 may establish its own trust relationship with the IDP server 210 through a registration process. During the registration process, the SP server 204 may receive an IDP public key 238 from the IDP server 210 that is a counterpart to the IDP private key 226 used to sign the IDP client token 216. Therefore, the SP server 204 may use the IDP public key 238 to verify the IDP digital signature 222 of the IDP client token 216. In doing so, the SP server 204 may validate the content and origin of the IDP client token 216.

Following validation of the IDP client token 216, the SP server 204 may extract the client public key 214 from the IDP client token 216 and use the client public key 214 to verify the client digital signature 232 of the client recursive authentication token 206. In doing so, the SP server 204 may validate the content and origin of the client recursive authentication token 206.

By validating the IDP client token 216 and the client recursive authentication token 206, the SP server 204 can confirm that the client device 202 obtained the IDP client token 216 from a trusted IDP server 210 and that the client recursive authentication token 206 had not been altered since being created by the client device 202.

Figure 3:
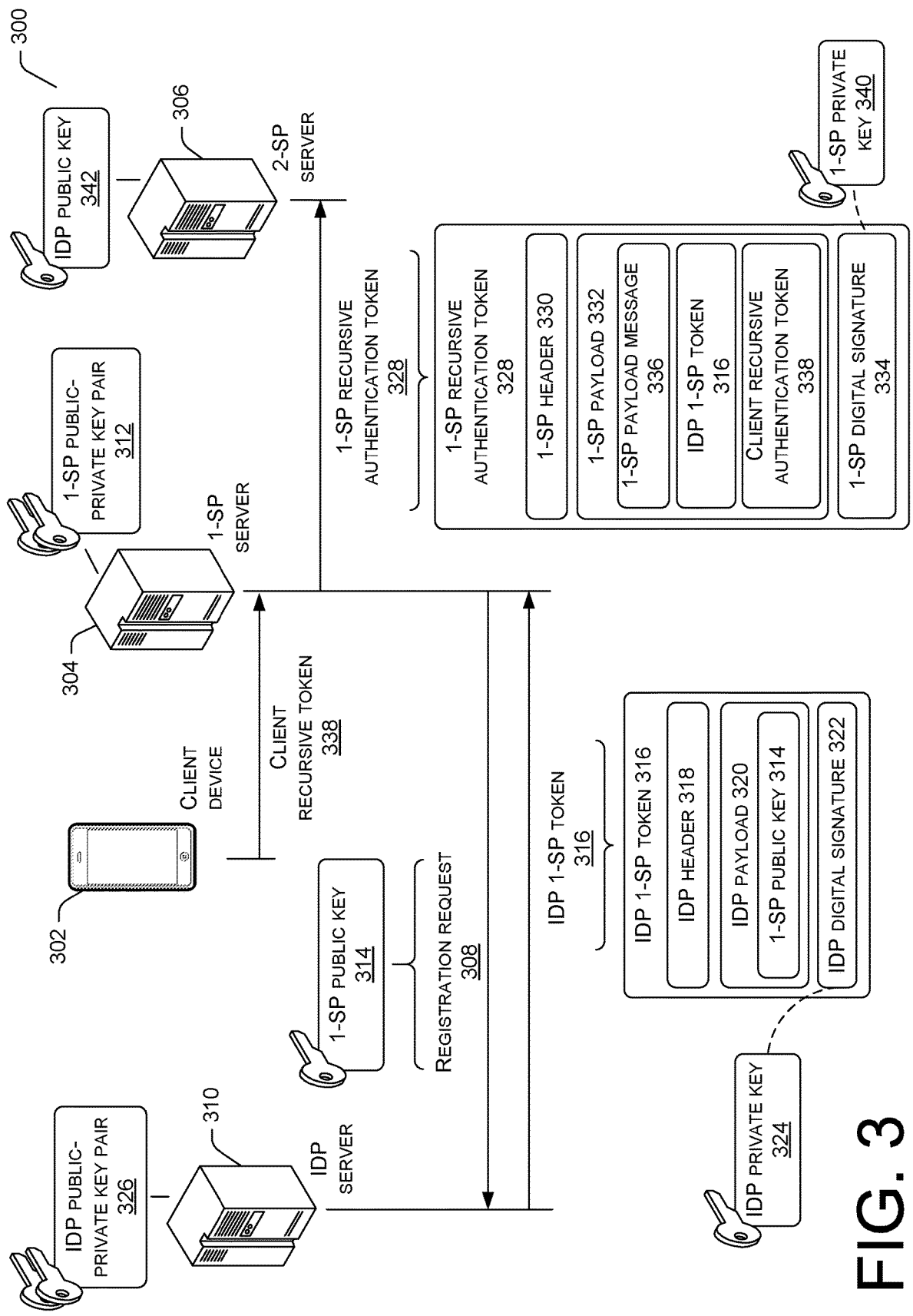
FIG. 3 illustrates a block diagram of a process for generating a first service provider (1-SP) recursive authentication token for use by the 1-SP in accessing a secure service provided by a second service provider (2-SP).

FIG. 3 illustrates a block diagram of a process 300 for generating a first service provider (1-SP) recursive authentication token for use by the 1-SP in accessing a secure service provided by a second service provider (2-SP). In the illustrated example, process 300 may be initiated by a client device 302 requesting access to a secure service provided by the 1-SP server 304. In a non-limiting example, the secure service may relate to establishing a communicative connection with a recipient device via the 1-SP server 304. However, as part of the provisioning process, the 1-SP server 304 may require access to additional secure services provided by the 2-SP server 306. By way of example, the additional secure services may relate to policy information associated with the client device 302. In any event, the 1-SP server 304 may be configured, via a recursive authentication token application, to nest preceding authentication tokens that trace back to the initial secure service request from the client device 302.

Referring to FIG. 3 and from the perspective of the 1-SP server 304, the 1-SP server 304 may transmit a registration request 308 to an IDP server 310 for the purpose of establishing a trust relationship. As part of the registration process, the 1-SP server 304 may generate a 1-SP public-private key pair 312 (i.e. an asymmetric public-private key pair) and transmit the 1-SP public key 314 to the IDP server 310. Upon receipt, the IDP server 310 may optionally store the 1-SP public key 314 in a data store.

Following the registration process, the IDP server 310 may generate an IDP 1-SP token 316 that include an IDP header 318, an IDP payload 320, and an IDP digital signature 322. The IDP header 318 may include information relating to the type of token and a digital signature algorithm used for the IDP 1-SP token 316 (i.e. HMAC with SHA256, ECDSA, RSASSA-PSS, etc.) and the components (i.e. header and/or payload) that are hashed to generate the IDP digital signature 322.

The IDP payload 320 may include the 1-SP public key 314 that the 1-SP server 304 shared with the IDP server 310 during the registration process. In some examples, the IDP payload 320 may also include additional information provided during registration, such as a transaction identifier or a 1-SP identifier.

The IDP server 310 may generate the IDP digital signature 322 using an IDP private key 324 of an IDP public-private key pair 326 created by the IDP server 310. Further, the IDP server 310 may generate the IDP digital signature 322 by signing the IDP header 318 and the IDP payload 320 with the IDP private key 324. Accordingly, the IDP digital signature 322 may be used to verify an identity of the IDP server 310 as the original sender of the IDP 1-SP token 316, and to further ensure that the IDP 1-SP token 316 had not been modified since being sent by the IDP server 310.

Upon receipt of the IDP 1-SP token 316, the 1-SP server 304 may generate, via a recursive authentication token application, a 1-SP recursive authentication token 328 that is intended for delivery to the 2-SP server 306. The 1-SP recursive authentication token 328 may comprise a 1-SP header 330, a 1-SP payload 332, and a 1-SP digital signature 334. The 1-SP header 330 may include information regarding the type of token, the digital signature algorithm used to generate for the 1-SP recursive authentication token 328, and an identification of the components that are hashed to generate the 1-SP digital signature 334.

The 1-SP payload 332 may include the IDP 1-SP token 316, a 1-SP payload message 336 associated with a request for access to a secure service provided by the 2-SP server 306, and the client recursive authentication token 338 received from the client device 302. It is noteworthy that the client recursive authentication token 338 may correspond to the client recursive authentication token 206 as illustrated in FIG. 2.

The 1-SP digital signature 334 may be generated by signing the 1-SP header 330 and/or the 1-SP payload 332 with a 1-SP private key 340 of a 1-SP public-private key pair 312 generated by the 1-SP server 304 and using the digital signature algorithm identified in the 1-SP header 330. Accordingly, the 1-SP digital signature 334 may be used to verify the identity of the 1-SP server 304 as the sender of the 1-SP recursive authentication token 328 since the IDP 1-SP token 316, nested therein, includes the counterpart 1-SP public key 314 of the 1-SP public-private key pair 312.

From the perspective of the 2-SP server 306, prior to validating the 1-SP recursive authentication token 328, the 2-SP server 306 may establish its own trust relationship with the IDP server 310 through a registration process. During the registration process, the 2-SP server 306 may receive an IDP public key 342 from the IDP server 310 that is a counterpart to the IDP private key 324 used to sign the IDP 1-SP token 316. Therefore, the 2-SP server 306 may use the IDP public key 342 to verify the IDP digital signature 322 of the IDP 1-SP token 316. In doing so, the 2-SP server 306 may validate the content and origin of the IDP 1-SP token 316.

Following validation of the IDP 1-SP token 316, the 2-SP server 306 may extract the 1-SP public key 314 from the IDP 1-SP token 316 and use the 1-SP public key 314 to verify the 1-SP digital signature 334 of the 1-SP recursive authentication token 328. In doing so, the 2-SP server 306 may validate the content and origin of the 1-SP recursive authentication token 328.

By validating the IDP 1-SP token 316 and the 1-SP recursive authentication token 328, the 2-SP server 306 can confirm that the 1-SP server 304 obtained the IDP 1-SP token 316 from trusted IDP server 310 and that the 1-SP recursive authentication token 328 has not been altered since being created by the 1-SP server 304.

Figure 4:
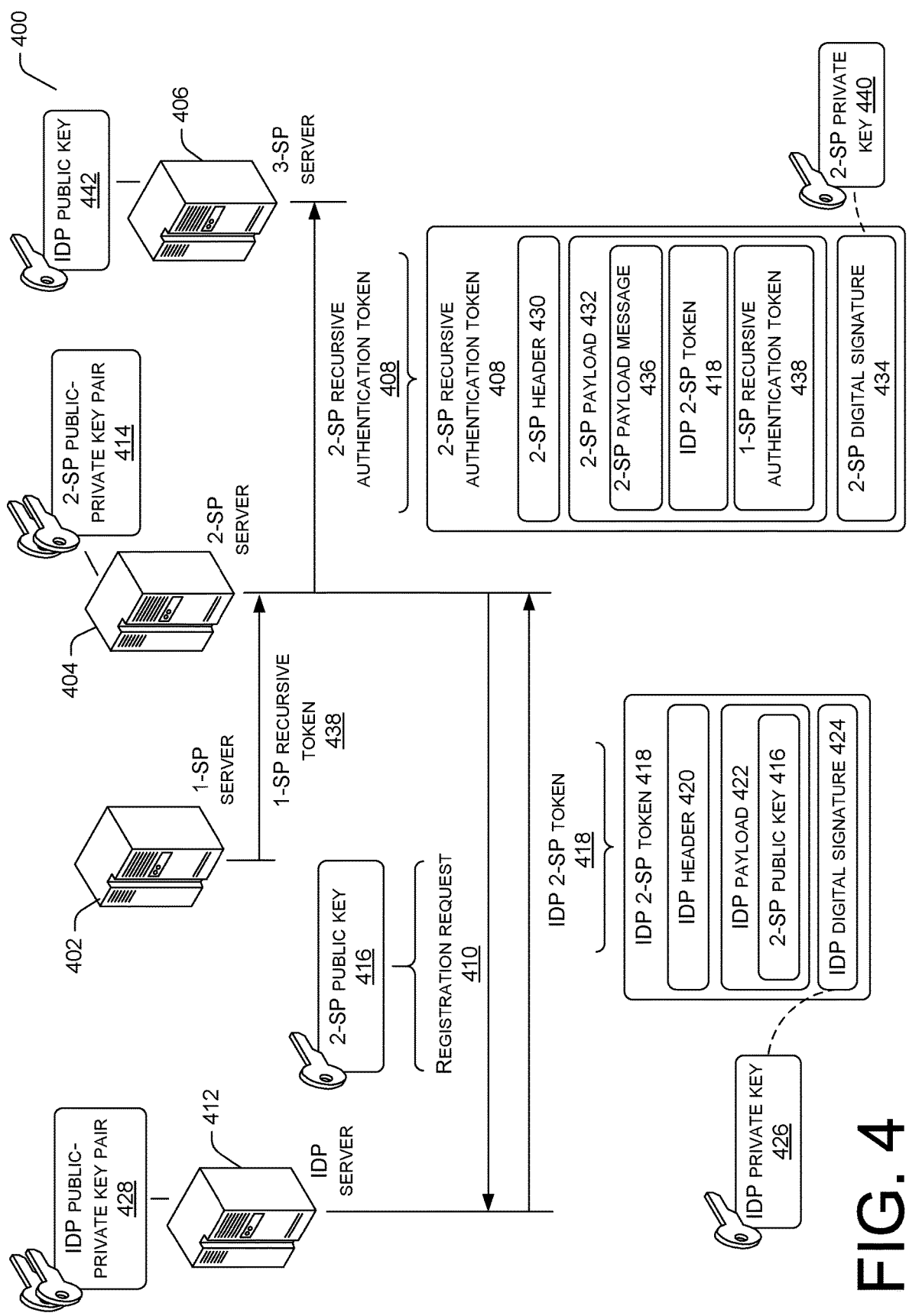
FIG. 4 illustrates a block diagram of a process for generating a second service provider (2-SP) recursive authentication token for use by a third service provider (3-SP).

FIG. 4 illustrates a block diagram of a process 400 for generating a second service provider (2-SP) recursive authentication token for use by a third service provider (3-SP). In the illustrated example, process 400 is initiated by a client device requesting access to a secure service from a first service provider (1-SP) server. In a non-limiting example, the secure service may relate to establishing a data communication with a recipient device. However, as part of the provisioning process, the 1-SP server 402 may require access to additional secure services provided by a 2-SP server 404, which in turn may require an additional secure service from a 3-SP server 406. By way of example, the additional secure services may relate to policy information associated with the client device or network metadata related to the initial request of establishing a data communication. In any event, the 2-SP server 404 may be configured, via a recursive authentication token application, to nest preceding authentication tokens that trace back to the initial secure service request from a client device.

In the illustrated example, the 3-SP server 406 may use the 2-SP recursive authentication token 408 to verify an identity of the sender, namely the 2-SP server 404. The 2-SP recursive authentication token 408 may also be used to audit the cascade of authentication tokens that were sent and received as part of the client device's initial secure service request.

Referring to FIG. 4 and from the perspective of the 2-SP server 404, the 2-SP server 404 may transmit a registration request 410 to an IDP server 412 for the purpose of establishing a trust relationship. As part of the registration process, the 2-SP server 404 may generate a 2-SP public-private key pair 414 (i.e. an asymmetric public-private key pair) and transmit the 2-SP public key 416 to the IDP server 412. Upon receipt, the IDP server 412 may optionally store the 2-SP public key 416 in a data store.

Following the registration process, the IDP server 412 may generate an IDP 2-SP token 418 that includes an IDP header 420, an IDP payload 422, and an IDP digital signature 424. The IDP header 420 may include information relating to the type of token and a digital signature algorithm used for the IDP 2-SP token 418 (i.e. HMAC with SHA256, ECDSA, RSASSA-PSS, etc.) and the components (i.e. header and/or payload) that are hashed to generate the IDP digital signature 424.

The IDP payload 422 may include the 2-SP public key 416 shared with the IDP server 412 during the registration process. In some examples, the IDP payload 422 may also include additional information provided during registration, such as a transaction identifier or a 2-SP identifier.

The IDP server 412 may generate the IDP digital signature 424 using an IDP private key 426 of an IDP public-private key pair 428 created by the IDP server 412. Further, the IDP server 412 may generate the IDP digital signature 424 by signing the IDP header 420 and the IDP payload 422 with the IDP private key 426. Accordingly, the IDP digital signature 424 may be used to verify an identity of the IDP server 412 as the original sender of the IDP 2-SP token 418, and to further ensure that the IDP 2-SP token 418 had not been modified since being sent by the 1-SP server 402.

Upon receipt of the IDP 2-SP token 418, the 2-SP server 404 may generate, via a recursive authentication token application, a 2-SP recursive authentication token 408 that is intended for delivery to the 3-SP server 406. The 2-SP recursive authentication token 408 may comprise a 2-SP header 430, a 2-SP payload 432, and a 2-SP digital signature 434. The 2-SP header 430 may include information regarding the type of token, the digital signature algorithm used to generate the 2-SP recursive authentication token 408, and an identification of the components that are hashed to generate the 2-SP digital signature 434.

The 2-SP payload 432 may include the IDP 2-SP token 418 received from the IDP server 412, a 2-SP payload message 436 associated with a request for access to a secure service provided by the 3-SP server 406, and the 1-SP recursive authentication token 438 received by the 2-SP server 404 and from the 1-SP server 402. The 1-SP recursive authentication token 438 may correspond to the 1-SP recursive authentication token 438 illustrated in FIG. 3. It is noteworthy that the 1-SP recursive authentication token 438 may further include a client recursive authentication token 338 as illustrated in FIG. 3.

The 2-SP digital signature 434 may be generated by signing the 2-SP header 430 and/or the 2-SP payload 432 with a 2-SP private key 440 of a 2-SP public-private key pair 414 generated by the 2-SP server 404 and using the digital signature algorithm identified in the 2-SP header 430. Accordingly, the 2-SP digital signature 434 may be used to verify the identity of the 2-SP server 404 as the sender of the 2-SP recursive authentication token 408 since the IDP 2-SP token 418, nested therein, includes the counterpart 2-SP public key 416 of the 2-SP public-private key pair 414.

From the perspective of the 3-SP server 406, prior to validating the 2-SP recursive authentication token 408, the 3-SP server 406 may establish its own trust relationship with the IDP server 412 through a registration process. During the registration process, the 3-SP server 406 may receive an IDP public key 442 from the IDP server 412 that is a counterpart to the IDP private key 426 used to sign the IDP 2-SP token 418. Therefore, the 3-SP server 406 may use the IDP public key 442 to verify the IDP digital signature 424 of the IDP 2-SP token 418. In doing so, the 3-SP server 406 may validate the content and origin of the IDP 2-SP token 418.

Following validation of the IDP 2-SP token 418, the 3-SP server 406 may extract the 2-SP public key 416 from the IDP 2-SP token 418 and use the 2-SP public key 416 to verify the 2-SP digital signature 434 of the 2-SP recursive authentication token 408. In doing so, the 3-SP server 406 may validate the content and origin of the 2-SP recursive authentication token 408.

By validating the IDP 2-SP token 418 and the 2-SP recursive authentication token 408, the 3-SP server 406 can confirm that the 2-SP server 404 obtained the IDP 2-SP token 418 from a trusted IDP server 412 and that the 2-SP recursive authentication token 408 was not altered since being created by the 2-SP server 404.

Figure 5:
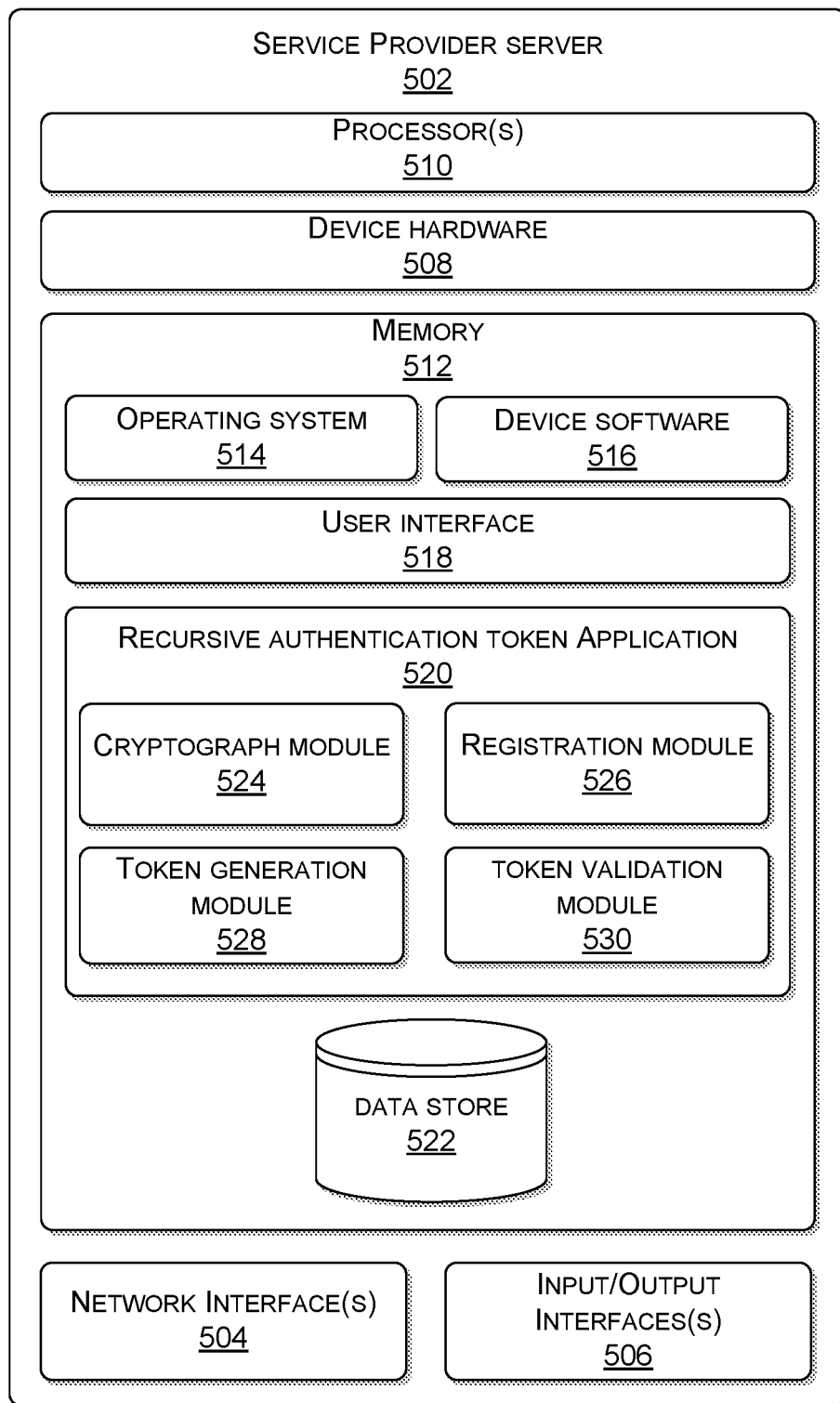
FIG. 5 illustrates a block diagram of various components of an SP server configured to execute a recursive authentication token application.

FIG. 5 illustrates a block diagram of various components of a service provider (SP) server configured to execute a recursive authentication token application. The SP server 502 may correspond to the service provider servers illustrated in FIG. 1, including 1-SP server 104, 2-SP server 106, or 3-SP server 108. The SP server 502 may include input/output interface(s) 504. The input/output interface(s) 504 may include any type of output interface known in the art, such as a display (e.g. a liquid crystal display), speakers, a vibrating mechanism, or a tactile feedback mechanism. Input/output interface(s) 504 also include ports for one or more peripheral devices, such as headphones, peripheral speakers, or a peripheral display. Further, the input/output interface(s) 504 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the SP server 502 may include network interface(s) 506. The network interface(s) 506 may include any sort of transceiver known in the art. For example, the network interface(s) 506 may include a radio transceiver that performs the function of transmitting and receiving radio frequency communications via an antenna. In addition, the network interface(s) 506 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 506 may include wired communication components, such as an Ethernet port or a Universal Serial Bus (USB). The device hardware 508 may include an additional hardware interface, data communication, or data storage hardware.

Further, the SP server 502 may include one or more processor(s) 510 that are operably connected to memory 512. In at least one example, the one or more processor(s) 510 may be a central processing unit(s) (CPU), graphics processing unit(s) (GPU), a CPU and GPU, or any other sort of processing unit(s). Each of the one or more processor(s) 510 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 510 may also be responsible for executing all computer applications stored in the memory, which can be associated with common types of volatile (RAM) and/or non-volatile (ROM) memory.

In some examples, memory 512 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 512 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 512 may include an operating system 514, device software 516, a user interface 518, a recursive authentication token application 520, and a data store 522. The operating system 514 may be any operating system capable of managing computer hardware and software resources. The operating system 514 may include an interface layer that enables applications to interface with the input/output interface(s) 504 and the network interface(s) 506. The interface layer may comprise public APIs, private APIs, or a combination of both. Additionally, the operating system 514 may include other components that perform various other functions generally associated with an operating system.

The device software 516 may include software components that enable the SP server 502 to perform functions, such as basic input/output system (BIOS), Boot ROM, or a bootloader that boots up the SP server 502 and executes the operating system 514 following power-up of the SP server 502.

A user interface 518 may enable a user to provide inputs and receive outputs from the SP server 502. Example data inputs may include a payload message that is intended to request access to an additional secure service provided by another SP server 502. Other example data inputs may be a selection of an IDP server or a selection of an additional SP server for a request for additional secure services. It is noteworthy that rather than inputting a payload message requesting access to an additional secure service, the payload message may be dynamically generated via a machine learning algorithm executed on the SP server 502.

The recursive authentication token application 520 may include routines, program instructions, objects, and/or data structures that perform particular tasks or implement particular abstract data types. The recursive authentication token application 520 may further include a cryptograph module 524, a registration module 526, a token generation module 528, and a token validation module 530. Each of these modules may include routines, program instructions, code segments, objects, and/or data structures that perform particular tasks or implement particular abstract data types.

The cryptograph module 524 may use an asymmetric key pair generation algorithm to generate the SP public-private key pair. For example, the asymmetric key pair generation algorithm may be the Rivest-Shamir-Adleman (RSA) algorithm, the Elliptic-Curve cryptography algorithm, the Paillier cryptosystem algorithm, the Cramer-Shoup cryptosystem algorithm, and/or so forth.

The registration module 526 may transmit a registration request to a select Identity Service Provider (IDP) server, such as 1-IDP server 112 or 2-IDP server 118 in order to receive an IDP SP token. The registration request may include an SP public key of the SP public-private key pair along with an identifier of the SP server 502. Further, the registration module 526 may receive an IDP SP token from the IDP server, in response to the registration request. The IDP SP token may include the SP public key of the SP public-private key pair nested within its payload.

The token generation module 528 may generate an SP recursive authentication token associated with an access request for secure service that is initiated by the SP server 502. The SP recursive authentication token may comprise a header, a payload, and a digital signature. The header may include information regarding the type of token and the digital signature algorithm used for the SP recursive authentication token (i.e. HMAC with SHA256, ECDSA, RSASSA-PSS, etc.), and an identification of the components that are hashed to generate the digital signature. The payload may include the IDP SP token received from an IDP server and a payload message associated with a request for access to the secure service provided by another SP server. The payload may further include a preceding recursive authentication token received by the SP server 502, as illustrated in FIGS. 3 and 4. The digital signature may be generated by signing the header and/or the payload with an SP private key of an SP public-private key pair generated by the cryptograph module 524 and using the digital signature algorithm identified in the header.

Accordingly, the digital signature may be used to verify the identity of the SP server 502 as the sender of the recursive authentication token since the IDP SP token, nested therein, includes the counterpart public key of the SP public-private key pair. In one example, the token generation module 528 may embed the recursive authentication token in an authorization header of a Hypertext Transfer Protocol (HTTP) request to deliver the recursive authentication token to another SP server. However, alternative methods of delivering the recursive authentication token may be used.

The token validation module 530 may validate a recursive authentication token received by the SP server 502 by first validating the content and origin of the IDP token nested within the recursive authentication token, and second, by validating the content and origin of the recursive authentication token, itself. The token validation module 530 may interact with the registration module 526 to establish its own trust relationship with an IDP server associated with a recursive authentication token that is received at the SP server 502. In doing so, the token validation module 530 may receive, from the registration module 526 and via the IDP server, an IDP public key from the IDP server that is a counterpart to an IDP private key used to digitally sign the IDP token nested within the recursive authentication token. Therefore, token validation module 530 may use the IDP public key to verify the IDP digital signature of the IDP token. By validating the IDP token, the token validation module 530 can confirm the content and origin of the IDP token.

Following validation of the IDP token, the token validation module 530 may extract a public key from the IDP token and further use the public key to verify the digital signature of the recursive authentication token. In doing so, the token validation module 530 may validate the content and origin of the recursive authentication token.

The data store 522 may include a repository of public-private key pairs generated by the cryptograph module 524, IDP SP tokens received via the registration module 526 from IDP servers, along with additional information used by the token generation module 528 to generate SP recursive authentication tokens. The additional information may include a transaction identifier, identification of an algorithm used to digitally sign an authentication token or a server identifier.

Figure 6:
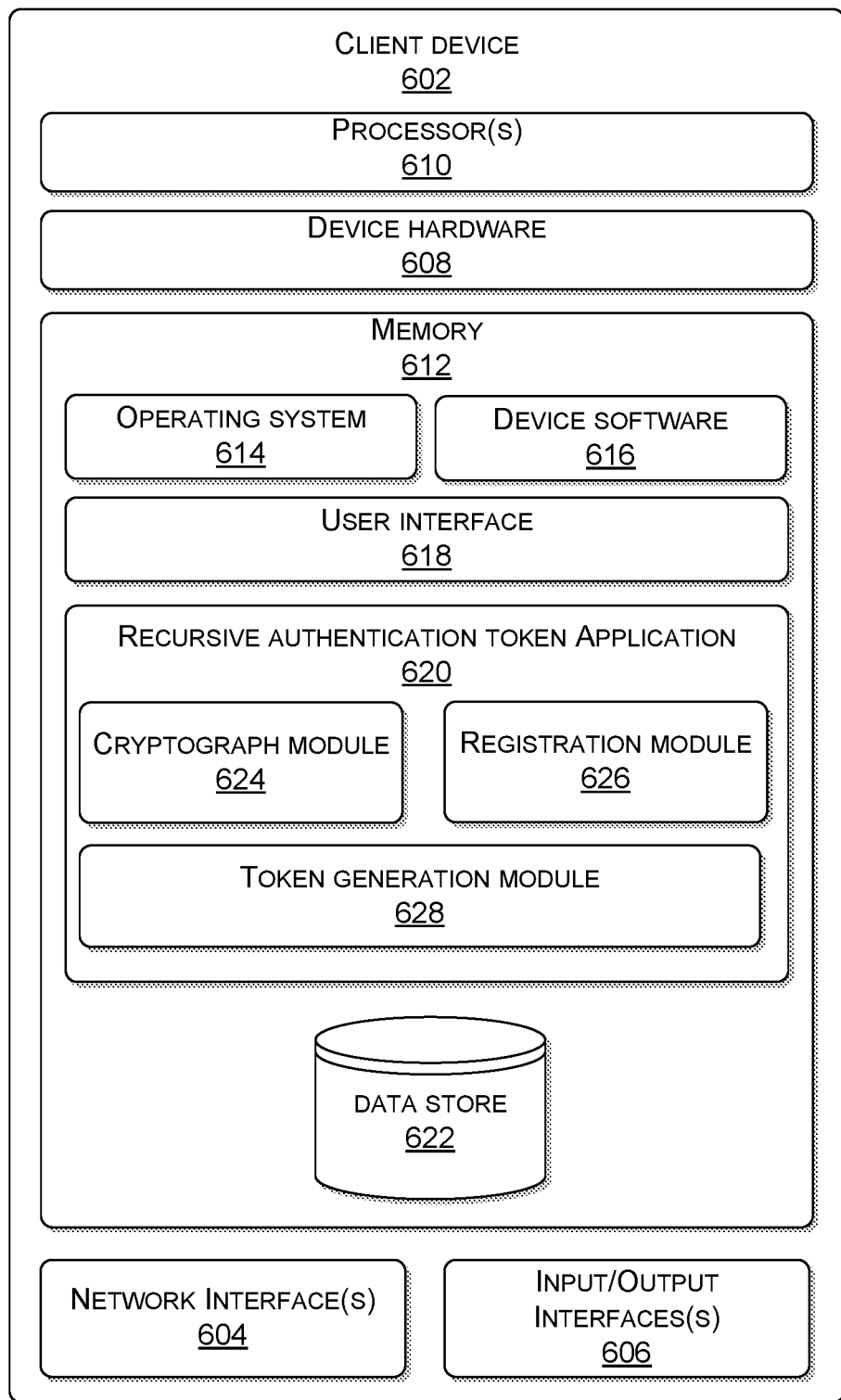
FIG. 6 illustrates a block diagram of various components of a client device configured to execute a recursive authentication token application.

FIG. 6 illustrates a block diagram of various components of a client device configured to execute a recursive authentication token application. The client device 602 may be configured to generate a client recursive authentication token that is to be delivered to a service provider (SP) server. The client recursive authentication token may be used by the SP server to validate a request for access to secure services provided by the SP server.

The client device 602 may include input/output interface(s) 604. The input/output interface(s) 604 may include any type of output interface known in the art, such as a display (e.g. a liquid crystal display), speakers, a vibrating mechanism, or a tactile feedback mechanism. Input/output interface(s) 604 also include ports for one or more peripheral devices, such as headphones, peripheral speakers, or a peripheral display. Further, the input/output interface(s) 604 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the client device 602 may include network interface(s) 606. The network interface(s) 606 may include any sort of transceiver known in the art. For example, the network interface(s) 606 may include a radio transceiver that performs the function of transmitting and receiving radio frequency communications via an antenna. In addition, the network interface(s) 606 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 606 may include wired communication components, such as an Ethernet port or a Universal Serial Bus (USB).

The device hardware 608 may include hardware that is typically located in a mobile telecommunication device. For example, the device hardware 608 may include signal converters, transceivers, antennae, hardware decoders and encoders, graphic processors, a Subscriber Identity Module (SIM) card slot, and/or the like that enables the client device 602 to execute applications and provide telecommunication and data communication functions. The SIM may be an integrated circuit chip that is inserted into the SIM card slot of the client device 602, or an embedded SIM that is hardwired into the circuit board of the client device 602.

Further, the client device 602 may include one or more processor(s) 610 that are operably connected to memory 612. The one or more processor(s) 610 may be similar to the one or more processor(s) 510 and the memory 612 may be similar to the memory 512.

In the illustrated example, the memory 612 may include an operating system 614, device software 616, a user interface 618, a recursive authentication token application 620, and a data store 622. The operating system 614 may be similar to the operating system 514 and the device software 616 may be similar to the device software 516.

The user interface 618 may enable a user to provide inputs and receive outputs from the client device 602. Example data inputs may include a payload message that is intended to request access to a secure service provided by an SP server. Other example data inputs may be a selection of an IDP server or a selection of an additional SP server for a request for additional secure services. It is noteworthy that rather than inputting a payload message requesting access to an additional secure service, the payload message may be dynamically generated via a machine learning algorithm executed on the client device 602.

The recursive authentication token application 620 may include routines, program instructions, objects, and/or data structures that perform particular tasks or implement particular abstract data types. The recursive authentication token application 620 may further include a cryptograph module 624, a registration module 626, and a token generation module 628. Each of these modules may include routines, program instructions, code segments, objects, and/or data structures that perform particular tasks or implement particular abstract data types.

The cryptograph module 624 may use an asymmetric key pair generation algorithm to generate a client public-private key pair. For example, the asymmetric key pair generation algorithm may be the Rivest-Shamir-Adleman (RSA) algorithm, the Elliptic-Curve cryptography (ECC) algorithm, the Paillier cryptosystem algorithm, the Cramer-Shoup cryptosystem algorithm, and/or so forth.

The registration module 626 may transmit a registration request to a select Identity Service Provider (IDP) server, such as the IDP server 210 illustrated in FIG. 2, in order to receive an IDP client token. The registration request may include a client public key of the client public-private key pair along with an identifier of the client device 602. Further, the registration module 526 may receive an IDP client token from the IDP server, in response to the registration request. The IDP client token may include the client public key of the client public-private key pair nested within its payload.

The token generation module 628 may generate a client recursive authentication token associated with an access request for secure service that is initiated by the client device 602. The recursive authentication token may comprise a header, a payload, and a digital signature. The header may include information regarding the type of token and the digital signature algorithm used for the client recursive authentication token (i.e. HMAC with SHA256, ECDSA, RSASSA-PSS, etc.), and an identification of the components that are hashed to generate the digital signature. The payload may include the IDP client token received from an IDP server and a payload message associated with a request for access to the secure service provided by an SP server. The digital signature may be generated by signing the header and/or the payload with a client private key of the client public-private key pair generated by the cryptograph module 624 and using the digital signature algorithm identified in the header.

Accordingly, the digital signature may be used to verify the identity of the client device 602 as the sender of the client recursive authentication token since the IDP client token, nested therein, includes the counterpart client public key of the client public-private key pair. In one example, the token generation module 528 may embed the recursive authentication token in an authorization header of a Hypertext Transfer Protocol (HTTP) request to deliver the recursive authentication token to an SP server. However, alternative methods of delivering the recursive authentication token may be used.

The data store 622 may include a repository of one or more of client public-private key pairs generated by the cryptograph module 624, IDP client tokens received via the registration module 626 from IDP servers, or additional information used by the token generation module 628 to generate client recursive authentication tokens. The additional information may include a transaction identifier, identification of an algorithm used to digitally sign an authentication token or a client identifier.

Figure 7:
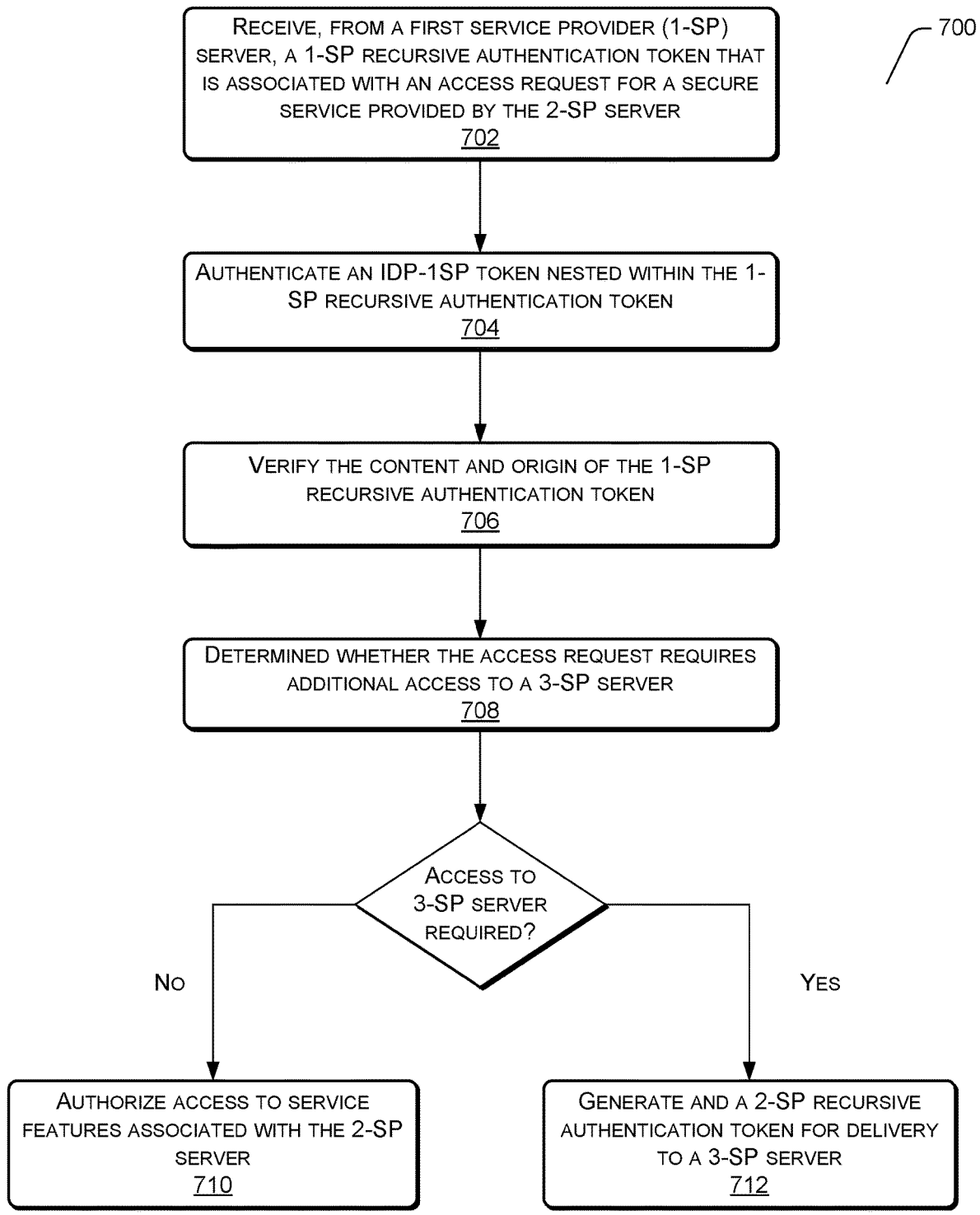
FIG. 7 illustrates a process for generating, via a recursive authentication token application, a second service provider (2-SP) recursive authentication token for use by a subsequent, third service provider (3-SP) server.

FIG. 7 presents process 700 that relates to operations of the recurve token application via a service provider server or client device. Process 700 illustrates a collection of blocks in a logical flow chart, which represents a sequence of operations that can be implemented in hardware, software, or a combination thereof In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, process 700 is described with reference to the example architecture 100 of FIG. 1.

FIG. 7 illustrates a process for generating, via a recursive authentication token application, a second service provider (2-SP) recursive authentication token for use by a subsequent, third service provider (3-SP) server. Process 700 is presented from the perspective of a second service provider (2-SP) server that receives a request to access a secure service provided by the 2-SP server, from a 1-SP server. It is noteworthy that 2-SP recursive authentication token discussed in process 300 is illustrated in FIG. 4 of this disclosure.

At 702, the 2-SP server may receive, from a 1-SP server a 1-SP recursive authentication token that is associated with access to a secure service provided by the 2-SP server. In this example, the 1-SP server may have previously received a request to access a secure service from a client device, however, the 1-SP server may require additional information and/or an additional secure service before providing the client device with access to the requested secure service. In this regard, the 1-SP server may request the additional information and/or secure service from the 2-SP server. Further, the 1-SP recursive authentication token may include nested within its payload a 1-SP payload message, an IDP 1-SP token, and a preceding client recursive token.

At 704, the 2-SP server may authenticate an IDP 1-SP token nested within the 1-SP recursive authentication token. By way of example, the 2-SP server may identify within the header of the IDP 1-SP token an IDP server used to generate the IDP 1-SP token. The 2-SP server may establish a trust relationship with the IDP server and in doing so, receive an IDP public key that is a counterpart to an IDP private key used to digitally sign the IDP 1-SP token.

Thus, the 2-SP server may use the IDP public key to verify the IDP digital signature of the IDP 1-SP token. By validating the IDP 1-SP token, the 2-SP server can confirm the content and origin of the IDP 1-SP token.

At 706, the 2-SP server may validate the content and origin of the 1-SP recursive authentication token. In this step, the 2-SP server may extract the 1-SP public key that is nested within the IDP 1-SP token and further use the 1-SP public key to verify the 1-SP digital signature of the 1-SP recursive authentication token.

At 708, the 2-SP server may parse through the payload message nested within the 1-SP recursive authentication token to determine whether additional information and/or additional secure services are required from a third SP (3-SP) server.

At 710, the 2-SP server may determine that additional information and/or additional secure services are not required from a 3-SP server. Therefore, the 2-SP may grant the 1-SP server with access to the secure service provided by the 2-SP server.

At 712, the 2-SP server may determine that additional information and/or additional secure services are required from a 3-SP server. In doing so, the 2-SP server may generate a 2-SP recursive authentication token for delivery to a 3-SP server. In this example, the 2-SP server may interact with a select IDP server to receive an IDP 2-SP token. In doing so, the 2-SP server may generate a 2-SP recursive authentication token that includes, nested within its payload, a payload message associated with a request for access to a secure service provided by the 3-SP server, the IDP 2-SP token, and the 1-SP recursive authentication token received by the 2-SP server from the 1-SP server.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
    receiving, from a client device and at a first service provider (1-SP) server, a client recursive authentication token that is associated with a request to access a secure service provided by the 1-SP server, the client recursive authentication token including a client header, a client payload, and client digital signature, the client payload including a client payload message and an Identity Service Provider (IDP) client token;
    receiving, from an IDP server associated with the IDP client token, an IDP public key of an IDP public-private key pair that was generated by the IDP server, the IDP public key being a counterpart of an IDP private key of the IDP public-private key pair that was used to digitally sign the IDP client token;
    validating a content and an origin of the client recursive authentication token, based at least in part on the IDP public key;
    determining that an additional secure service provided by a second service provider (2-SP) server is required to fulfill the request to access the secure service, based at least in part on the client payload message;
    generating a 1-SP recursive authentication token for delivery to the 2-SP server, the 1-SP recursive authentication token including a 1-SP header, a 1-SP payload and a 1-SP digital signature;
    embedding within the 1-SP payload at least a 1-SP payload message that indicates an access request for the additional secure service provided by the 2-SP server, an IDP 1-SP token associated with the 1-SP server, and the client recursive authentication token; and
    transmitting the 1-SP recursive authentication token to the 2-SP server.

2. The computer-implemented method of claim 1, further comprising:
    calculating a cryptographic hash for at least the 1-SP payload of the 1-SP recursive authentication token; and
    generating a 1-SP public-private key pair that is associated with the 1-SP server;
    generating the 1-SP digital signature using the cryptographic hash with a private key of the 1-SP public-private key pair.

3. The computer-implemented method of claim 1, wherein the IDP server is a first IDP server, and further comprising:
    generating a 1-SP public-private key pair that is associated with the 1-SP server;
    transmitting, to a second IDP server, a registration request associated with the 1-SP server, the registration request including at least a 1-SP public key of the 1-SP public-private key pair; and
    receiving, from the second IDP server, the IDP 1-SP token that includes an IDP header, an IDP payload that includes the 1-SP public key, and an IDP digital signature.

4. The computer-implemented method of claim 1, wherein the IDP client token includes an IDP header, an IDP payload, and an IDP digital signature, and further comprising:
    identifying, from the IDP header of the IDP client token, the IDP server that issued the IDP client token that is embedded within the client recursive authentication token; and
    transmitting, to the IDP server, a registration request that is associated with validating the IDP client token, and wherein, receiving the IDP public key from the IDP server is based at least in part on the registration request.

5. The computer-implemented method of claim 1, wherein the IDP client token includes an IDP header, an IDP payload, and an IDP digital signature, and further comprising:
    verifying the IDP digital signature of the IDP client token using the IDP public key, and
    wherein, validating the content and the origin of the client recursive authentication token is based at least in part on verifying the IDP digital signature.

6. The computer-implemented method of claim 5, further comprising:
    extracting, from IDP client token, a client public key associated with the client device; and
    verifying the client digital signature of the client recursive authentication token using the client public key, the client digital signature having been generated by a counterpart client private key by the client device, and
    wherein, validating the content and the origin of the client recursive authentication token is based at least in part on verifying the client digital signature.

7. The computer-implemented method of claim 1, wherein determining that the additional secure service provided by the 2-SP server is required, is based at least in part on a signature verification of the client payload message embedded within the client recursive authentication token.

8. The computer-implemented method of claim 1, further comprising:
    receiving, from the 2-SP server, access to the additional secure service, based at least in part on the 2-SP server having verified content and origin of the 1-SP recursive authentication token and the IDP 1-SP token embedded within the 1-SP recursive authentication token.

9. One or more non-transitory computer-readable media storing computer-executable instructions that, when executed on one or more processors, cause the one or more processors to perform acts comprising:
    receiving, from a first service provider (1-SP) server, a 1-SP recursive authentication token that is associated with a 1-SP request to access a secure service provided by a second service provider (2-SP) server, the 1-SP recursive authentication token including a 1-SP header, a 1-SP payload, and a 1-SP digital signature, the 1-SP payload further including a 1-SP payload message that includes the 1-SP request to access the secure service provided by the 2-SP server, an IDP 1-SP token, a client recursive authentication token, and the 1-SP digital signature;
    receiving, from an IDP server associated with the IDP 1-SP token, an IDP public key of an IDP public-private key pair that was generated by the IDP server, the IDP public key being a counterpart of an IDP private key of the IDP public-private key pair that was used to generate the IDP 1-SP token;
    validating a content and an origin of the IDP 1-SP token and the 1-SP recursive authentication token, based at least in part on the IDP public key;
    parsing through the 1-SP payload message to determine whether an additional secure service is required from a 3-SP server to fulfill the 1-SP request, based at least in part on validating the content and the origin of the IDP 1-SP token and the 1-SP recursive authentication token;

in response to determining that the additional secure service is required from the 3-SP server, generating a 2-SP recursive authentication token for delivery to the 3-SP server, the 2-SP recursive authentication token including a 2-SP header, a 2-SP payload, and a 2-SP digital signature, the 2-SP payload further including at least a 2-SP payload message that indicates an access request for the secure service from the 3-SP server, an IDP 2-SP token, and the 1-SP recursive authentication token; and transmitting the 2-SP recursive authentication token to the 3-SP server.

10. The one or more non-transitory computer-readable media of claim 9, wherein the IDP 1-SP token comprises an IDP header, an IDP payload, and an IDP digital signature, and further storing instructions that, when executed cause the one or more processors to perform acts comprising:

verifying the IDP digital signature of the IDP 1-SP token using the IDP public key, and wherein, validating the content and the origin of the IDP 1-SP token is based at least in part on verifying the IDP digital signature.

11. The one or more non-transitory computer-readable media of claim 10, further storing instructions that, when executed cause the one or more processors to perform acts comprising:

prior to verifying the IDP digital signature, parsing through the IDP header of the IDP 1-SP token to identify a digital signature algorithm used to digitally sign components of the IDP 1-SP token, and wherein verifying the IDP digital signature is based at least in part on the digital signature algorithm.

12. The one or more non-transitory computer-readable media of claim 10, further storing instructions that, when executred cause the one or more processors to perform acts comprising:

in response to verifying the IDP digital signature of the IDP 1-SP token, extracting, from the IDP 1-SP token, a 1-SP public key of a 1-SP public-private key pair generated by the 1-SP server; and validating the 1-SP recursive authentication token by verifying the 1-SP digital signature using the 1-SP public key, the 1-SP digital signature having been generated by a 1-SP private key of the 1-SP public-private key pair, and wherein, validating the content and the origin of the 1-SP recursive authentication token is based at least in part on verifying the 1-SP digital signature.

13. The one or more non-transitory computer-readable media of claim 9, wherein the IDP server is a first IDP server, and further storing instructions that, when executed cause the one or more processors to perform acts comprising:

in response to determining that the additional secure service is required from the 3-SP server, transmitting, to a second IDP server, a registration request associated with the 2-SP server, the registration request including at least a 2-SP public key of a 2-SP public-private key pair generated by the 2-SP server; and receiving, from the second IDP server, the IDP 2-SP token that includes an IDP header, an IDP payload, and an IDP digital signature, wherein the IDP payload includes the 2-SP public key.

14. The one or more non-transitory computer-readable media of claim 9, further storing instruction that, when executed cause the one or more processors to perform acts comprising:

in response to determining that the additional secure service is required from the 3-SP server, generating the 2-SP digital signature of the 2-SP recursive authentication token by digitally signing at least one of the 2-SP header and the 2-SP payload using a 2-SP private key of a 2-SP public-private key pair generated by the 2-SP server.

15. The one or more non-transitory computer-readable media of claim 9, further storing instructions that, when executed cause the one or more processors to perform acts comprising:

in response to determining that the additional secure service is not required from the 3-SP server, granting the 1-SP server with access to the secure service provided by the 2-SP server.

16. A system comprising:

one or more processors;

memory coupled to the one or more processors, the memory including one or more modules that are executable by the one or more processors to:

receive a first recursive authentication token from a sender device, the first recursive authentication token comprising a first header, a first payload, and a first digital signature, the first payload including at least a first IDP token and a first payload message that requests access to an initial secure service, the sender device being one of a client device or a service provider (SP) server;

identify an IDP server associated with the first IDP token, based at least in part on an IDP header component of the first IDP token;

retrieve from the IDP server an IDP public key of an IDP public-private key pair generated by the IDP server, based at least in part on an interaction with the IDP server;

in response to verifying an IDP digital signature of the first IDP token using the IDP public key, extract, from the first IDP token, a first public key associated with the sender device;

verify a first digital signature of the first recursive authentication token using the IDP public key;

in response to decrypting the first recursive authentication token, parse through the first payload message of the first recursive authentication token to determine whether access to an additional secure service is required to fulfill the initial secure service;

in response to determining that access to the additional secure service is required from an additional SP server, generate a second recursive authentication token that comprises a second header, a second payload, and a second digital signature, the second payload including at least a second payload message associated with the additional secure service, a second IDP token, and the first recursive authentication token; and transmit the second recursive authentication token to the additional SP server.

17. The system of claim 16, wherein the one or more modules are further executable by the one or more processors to:

generate a public-private key pair;

calculate a cryptographic hash for at least one of the second header and the second payload; and generate the second digital signature that is associated the second recursive authentication token using the cryptographic hash with a private key of the public-private key pair.

18. The system of claim 16, wherein the IDP server is a first IDP server, and wherein the one or more modules are further executable by the one or more processors to:
generate a public-private key pair;
transmit, to a second IDP server, a registration request that includes a public key of the public-private key pair; and
receive, from the second IDP server, the second IDP token, the second IDP token comprising an IDP header, an IDP payload that includes the public key, and an IDP digital signature.

19. The system of claim 16, wherein the one or more modules are further executable by the one or more processors to:
in response to determining that access to the additional secure service is not required from the additional SP server, grant the sender device with access to the initial secure service.

20. The system of claim 16, wherein the first recursive authentication token is included within a Hypertext Transfer Protocol (HTTP) request, and
wherein the IDP token, the first recursive authentication token, and the second recursive authentication token are JavaScript Object Notation (JSON) Web Token (JWT).

* * * * *